US010035338B2

(12) United States Patent
Howard

(10) Patent No.: US 10,035,338 B2
(45) Date of Patent: Jul. 31, 2018

(54) METHOD AND APPARATUS FOR IN-LINE SOLVENTLESS LAMINATION

(71) Applicant: Mark Andy, Inc., Chesterfield, MO (US)

(72) Inventor: John Bailey Howard, Wildwood, MO (US)

(73) Assignee: MARK ANDY, INC., Chesterfield, MO (US)

( * ) Notice: Subject to any disclaimer, the term of this patent is extended or adjusted under 35 U.S.C. 154(b) by 0 days.

(21) Appl. No.: 14/309,886

(22) Filed: Jun. 19, 2014

(65) Prior Publication Data

US 2015/0020949 A1    Jan. 22, 2015

Related U.S. Application Data

(60) Provisional application No. 61/841,537, filed on Jul. 1, 2013.

(51) Int. Cl.
*B29C 65/00* (2006.01)
*B29C 35/00* (2006.01)
(Continued)

(52) U.S. Cl.
CPC .............. *B32B 37/12* (2013.01); *C09J 5/04* (2013.01); *B32B 2037/1269* (2013.01);
(Continued)

(58) Field of Classification Search
CPC ..... B29C 35/02; B29C 35/08; B29C 35/0261; B29C 65/00; B29C 65/02; B29C 65/08;
(Continued)

(56) References Cited

U.S. PATENT DOCUMENTS 6,224,793 B1 * 5/2001 Hoffman .................. B01J 13/04
264/4.1
2004/0014860 A1    1/2004 Meier et al.
(Continued)

FOREIGN PATENT DOCUMENTS

| EP | 1647587 A1 | 4/2006 |
| EP | 1 859 916 A | 11/2007 |
| EP | 1 859 916 A1 | 11/2007 |

OTHER PUBLICATIONS

International Search Report and Written Opinion for PCT/US2014/43298 dated Oct. 28, 2014 pp. 15.
(Continued)

*Primary Examiner* — Michael N Orlando
*Assistant Examiner* — Matthew Hoover
(74) *Attorney, Agent, or Firm* — Foley & Lardner LLP

(57) ABSTRACT

A method of adhering first and second elongate webs includes depositing a first component of a two-component adhesive on a first face of the first elongate web and depositing a second component of the two-component adhesive on a first face of the second elongate web. The first face of the first elongate web and the first face of second elongate web are brought into contact, and the two components are mixed ultrasonically. In an alternate method, a two-component adhesive on at least a first face of the first elongate web, with at least one of the two components micro-encapsulated so that the two components of the two-component adhesive do not react. The first face of the first elongate web and the first face of the second elongate web are brought into contact. Ultrasound and/or heat is applied to free the micro-encapsulated components of the two-component adhesive, so that the components of the two component adhesive can react.

4 Claims, 2 Drawing Sheets

(51) Int. Cl.
*B32B 37/12* (2006.01)
*C09J 5/04* (2006.01)

(52) U.S. Cl.
CPC ..... *B32B 2310/028* (2013.01); *B32B 2425/00* (2013.01); *C09J 2205/11* (2013.01); *C09J 2205/31* (2013.01)

(58) Field of Classification Search
CPC ..... B29C 65/14; B29C 65/48; B29C 65/4805; B29C 65/485
See application file for complete search history.

(56) References Cited

U.S. PATENT DOCUMENTS

| | | | |
|---|---|---|---|
| 2005/0133145 A1* | 6/2005 | Blenke | B29C 66/45 156/73.1 |
| 2007/0055032 A1 | 3/2007 | Langenbuch et al. | |
| 2008/0094805 A1* | 4/2008 | Tuominen | H01L 23/5389 361/728 |
| 2008/0178986 A1* | 7/2008 | Siavoshani | C09J 5/06 156/73.1 |
| 2008/0308226 A1* | 12/2008 | Imai | C09J 175/04 156/327 |

OTHER PUBLICATIONS

International Preliminary Report on Patentability and Written Opinion of the International Searching Authority in PCT/US2014/043298 dated Jan. 14, 2016, 9 pages.
Supplementary Partial European Search Report dated Feb. 6, 2017, received in corresponding European application No. 14 820 355.7, 5 pages.
Office Action dated Nov. 1, 2016, received in corresponding Chinese application No. 201480041442.9, 8 pages.
Extended European Search Report received in corresponding European application No. 14 82 0355.7 dated May 12, 2017, 7 pages.
Examination Report dated May 8, 2018 in corresponding European application No. 14 820 355.7, 3 pages.

* cited by examiner

METHOD AND APPARATUS FOR IN-LINE SOLVENTLESS LAMINATION

FIELD

The present disclosure relates to methods of and apparatus for the lamination of elongate web materials.

BACKGROUND

This section provides background information related to the present disclosure which is not necessarily prior art.

A "flexible package" is normally made of very flexible and conformable materials that do not have a fixed shape; it can conform to the product it is holding, may stretch around the product, and is typically puncture resistant. Flexible packaging is popular because forming a flexible package is simple, unfilled packages require little storage space, even filled packages occupy less overall volume than a rigid alternative, and finally flexible packaging materials offer excellent display graphics possibilities. Display graphics are important because the flexible package usually is a consumer product, and the package itself becomes the prime label. Display graphics are usually printed by a flexographic process or a gravure process. It is important that constituents of the ink NOT end up in the interior of the package where it could contaminate the product; this could happen by means of migration through the packaging materials or by offsetting in the rewound roll (the rewound roll is an intermediate step of forming the flexible package).

Flexible packages are usually laminated structures, i.e., unique materials either co-extruded or adhesive bonded to achieve a set of performance attributes, such as puncture resistance, water vapor permeability, oxygen permeability, ink migration, adhesive migration, heat seal ability, etc. Laminated or co-extruded structures can be used pre-constructed before printing of the display graphics, but then there would be ink exposed which may not resist damage from mechanical contact and/or which may migrate or offset and find its way to the interior of the package. Most often, the display graphics are reverse printed on the interior side of the package, and then a barrier material is laminated over the graphics to protect the graphics and to prevent ink migration or offsetting. Where adhesive is used, migration of the adhesive must also be taken into consideration.

The bond between the layers comprising the laminate usually needs to be stronger than the laminate materials themselves, and one of the materials will fail during delaminating before the adhesive fails. There are different adhesive systems available which are water-based, solvent-based, and two-part epoxy. The two-part epoxy is known more commonly as solventless and is the primary system used in flexible packaging because it yields the highest bond strength—a destructive bond.

Solventless lamination conventionally begins by mixing the two components of the epoxy. When mixed, a chemical reaction begins which polymerizes the adhesive into a solid over a period of time. The period of time that the mixed epoxy can be handled in application machinery is termed the pot life. After the epoxy is mixed, it is applied to the base substrate, after which a laminate material is applied and the construction then wound into a roll. The bond strength at the initial lamination is termed the green bond, which is a fraction of the final bond strength, that final bond strength requiring as much as 72 hours to achieve. The green bond strength, immediately after laminating, typically is not enough to allow the construction to be run through slitters. Pot life, green bond strength, and final bond strength are related, and a longer pot life typically means a reduced green bond strength and longer time to final bond strength. Ideally, pot life would be infinite and green bond strength would immediately equal final bond strength, but the practical pot life requirements of the operation results in low green bond strengths and about a 72 hour time to final bond strength.

Solventless lamination is usually a separate operation from printing because the pot life of the mixed epoxy is shorter than the press changeover time. If the laminator is stopped for a press changeover, it would have to be cleaned up to prevent curing of the epoxy in the equipment, while in an offline process, the laminator runs continuously and seldom stops.

Thus, a typical process involves printing display graphics and rewinding; queuing up the solventless laminator, laminating the layers and rewinding; queuing up the slitter, (waiting for sufficient bond strength), and slitting and rewinding; and queuing up for shipment (waiting for final bond strength).

SUMMARY

This section provides a general summary of the disclosure, and is not a comprehensive disclosure of its full scope or all of its features.

Embodiments of the present invention provide a method and apparatus for in-line solventless lamination. According to a first preferred embodiment, the components of a two-part epoxy are applied separately to individual webs, and the two webs are brought together to form the laminate, and the components mixed to actuate the epoxy. This mixing is preferably accomplished by ultrasonic cavitation, sometimes called "sonication".

According to a second preferred embodiment, the components of a two-part epoxy are provided, such that mechanical mixing alone does not start the chemical reaction, but rather requiring a secondary post application action after the epoxy has been applied between the two webs. This post application action is preferably accomplished by ultrasonic cavitation, or "sonication". The epoxy mixture applied to one web with at least one micro-encapsulated component could alternatively be sonicated before the laminate web is brought into contact, i.e., the epoxy curing chemical reaction started after application to the first web, but before lamination of the second web. Heat can also be used to free micro-encapsulated components, and in some embodiments instead of, or in addition to, the application of ultrasound, heat can be applied to release one or both components from micro-encapsulation.

Ultrasonic cavitation is a very effective type of dynamic agitation based on the growth and implosive collapse of bubbles in liquid due to ultrasonic vibrations. Cavitation results from pre-existing weak points in the liquid, such as gas-filled crevices in suspended particulate matter or transient micro-bubbles from prior cavitation events. As ultrasound passes through a liquid, the expansion cycles exert negative pressure on the liquid, pulling the molecules away from one another. Where the ultrasonic energy is sufficiently intense, the expansion cycle creates cavities in the liquid when the negative pressure exceeds the local tensile strength of the liquid, which varies according to the type and purity of liquid.

The growth and violent collapse of the bubbles themselves provides a desirably rigorous agitation of the liquid. Cavitation that occurs at the interface between the ultrasonically energized liquid and a solid surface can be asymmetric and generates high-speed jets of liquid, further agitating the liquid. This type of cavitation is particularly useful, for example, in facilitating a more complete mixing together of two or more components of a liquid solution.

Because the application equipment is not exposed to mixed and activated epoxy, there is no pot life to operate within. The system could be stopped for an indefinite period of time with no ill effect. Furthermore, since there are no pot life issues to be concerned with, the epoxy system can be formulated to react immediately, giving at least enough green bond strength to conduct slitting immediately in the same pass as graphics printing and lamination.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
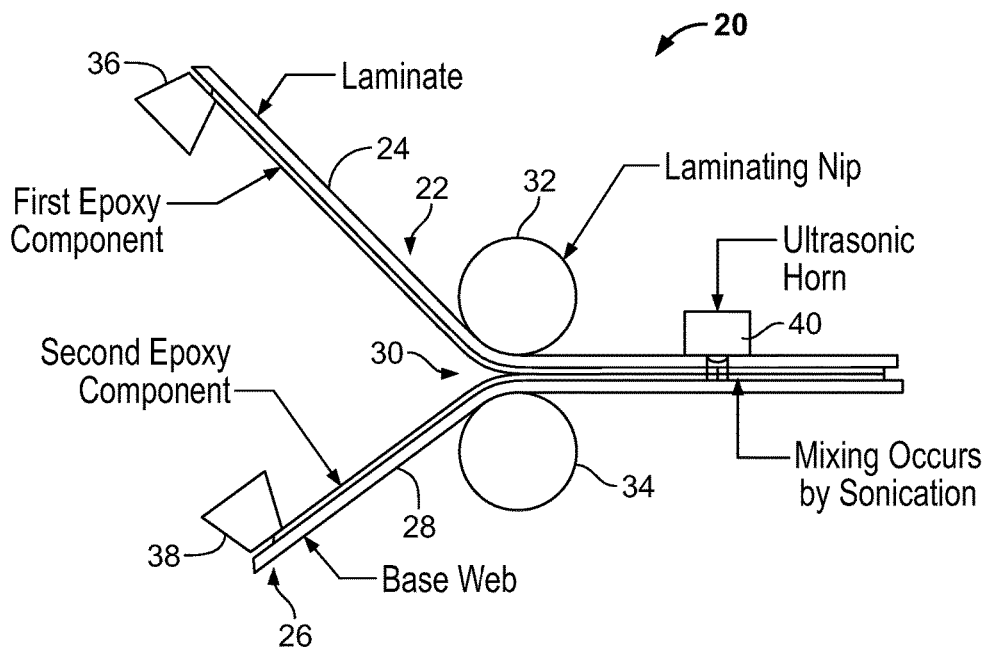
FIG. 1 is a schematic diagram of a first preferred embodiment of a method and apparatus for in-line solventless lamination, in accordance with the principles of this invention.

A first preferred embodiment of a system for in-line solventless lamination in accordance with the principles of this invention is indicated generally as 20 in FIG. 1. The system 20 is adapted for the in-line solventless lamination of first and second elongate webs with a two-component adhesive, and comprises a first web path 22 for the first elongate web 24, and a second web path 26 for the second elongate web 28. The first and second web paths 22 and 26 join at a juncture 30, where the first faces of the first and second elongate webs 24 and 28 are brought together and move together in face-to-face relationship. This juncture can include nip rollers 32 and 34, which can act to press the first and second elongate webs 24 and 28 together.

The system 20 includes an applicator 36 for applying a first component of the two-component adhesive to the first face of the first elongate web 24, proximal to the juncture 30. The system 20 also includes an applicator 38 for applying a second component of the two-component adhesive on a first face of the second elongate web 28, proximal to the juncture 30.

As the first and second webs 24 and 28 are brought together, the two components of the two-component adhesive contact each other and mix. However, to enhance this mixing, an ultrasonic mixer 40 is provided distal to the juncture 30 for mixing the first and second components of the two-component adhesive between the first and second elongate webs 24 and 28.

This arrangement eliminates the use of pre-mixed adhesives, which can set when operation of the equipment is temporarily suspended, interfering with resumption of operation of the system.

Figure 2:
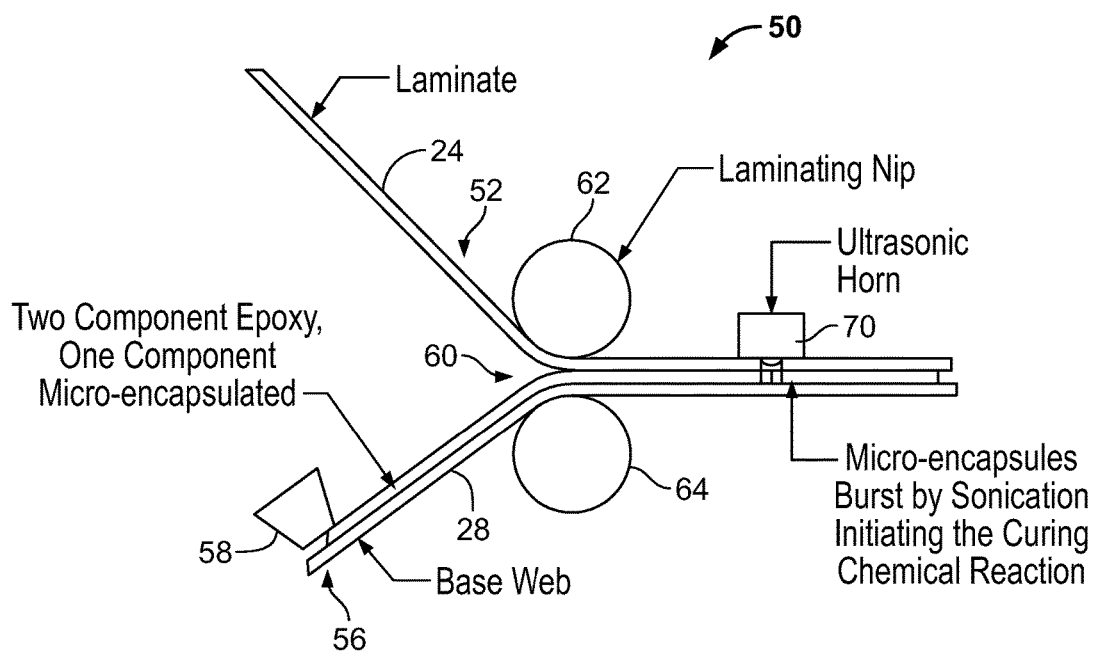
FIG. 2 is a schematic diagram of a second preferred embodiment of a method and apparatus for in-line solventless lamination, in accordance with the principles of this invention.

A second preferred embodiment of a system for in-line solventless lamination in accordance with the principles of this invention is indicated generally as 50 in FIG. 2. The system 50 is adapted for the in-line solventless lamination of first and second elongate webs with a two-component adhesive, and comprises a first web path 52 for the first elongate web 24, and a second web path 56 for the second elongate web 28. The first and second web paths 52 and 56 join at a juncture 60, where the first faces of the first and second elongate webs 24 and 28 are brought together and move together in face-to-face relationship. This juncture can include nip rollers 62 and 64, which can act to press the first and second elongate webs 24 and 28 together.

The system 50 includes an applicator 68 for applying the two-component adhesive to the first face of the first elongate web 24, proximal to the juncture 60. The bringing together of the first and second webs 24 and 28 is generally not sufficient to release the second component to initiate the two-component adhesive. However, the system 50 can include an ultrasonic mixer 70 for releasing the second component of the two-component adhesive from the micro-encapsulation and mixing the first and second components of the two-component adhesive. The ultrasonic mixer 70 is preferably disposed downstream or distal to the juncture 60. In an alternate construction shown in FIG. 3, the ultrasonic mixer 70 is positioned upstream or proximal to the juncture, and for releasing the second component of the two-component adhesive from the micro-encapsulation, and mixing the first and second components of the two-component adhesive.

Instead of, or in addition to an ultrasonic mixer 70, a heater (not shown) can be provided to free the microencapsulated components of the two part adhesive.

Figure 3:
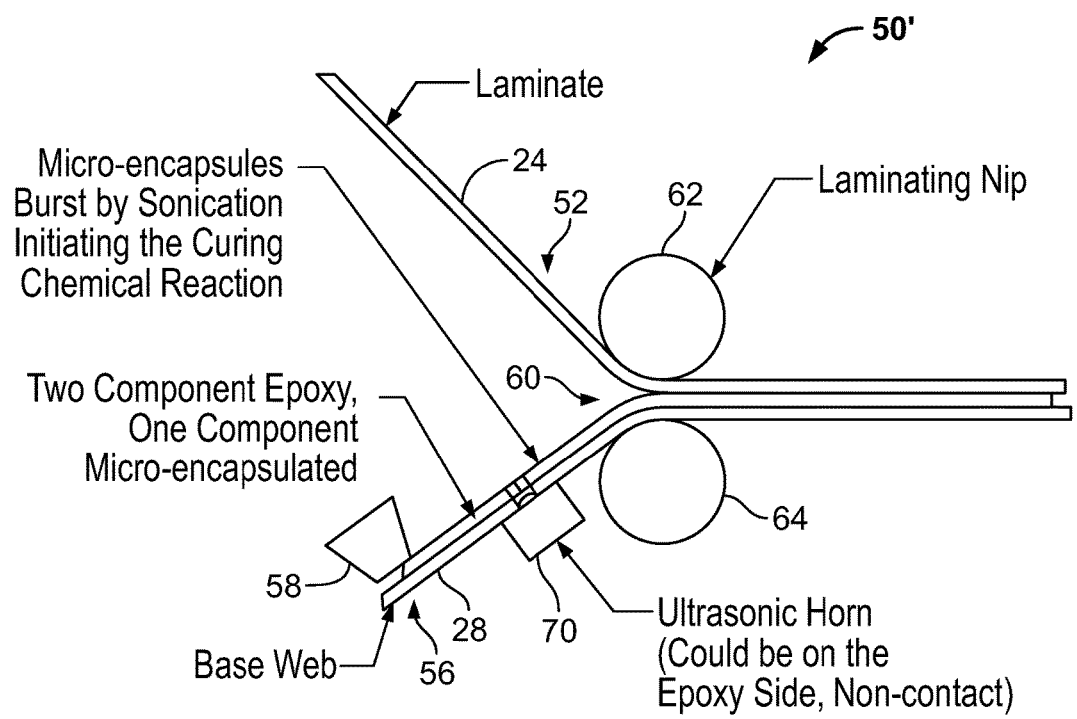
FIG. 3 is a schematic diagram of an alternate construction of the second preferred embodiment of a method and apparatus for in-line solventless lamination, in accordance with the principles of this invention.

An alternate construction of the system of the second embodiment is indicated generally as 50' in FIG. 3. The system 50' is similar to system 50, and corresponding parts are identified with corresponding reference numerals. In system 50', the ultrasonic curing system 70 is disposed proximal to the juncture 60 so that the adhesive is activated (e.g., mixed, or released from microencapsulation and mixed) just before the webs 24 and 28 are joined, and before the adhesive has time to cure.

OPERATION

In operation a system 20 or 50 or 50' is provided for making laminates for packing or labeling. The laminate comprises first and second elongate webs 24 and 28 adhesively bonded together, for example to provide a laminate for making flexible packages.

A first component of a two-component adhesive id deposited on a first face of the first elongate web. A second component of the two-component adhesive on a first face of the second elongate web. The first face of the first elongate web and the first face of second elongate web are brought into contact. The first and second components of the two-component adhesive between the first and second elongate webs are ultrasonically mixed.

In another embodiment, the two-component adhesive has one of the components separated by from the other by micro-encapsulation. The two-component adhesive is deposited on at least a first face of the first elongate web. The first face of the first elongate web and the first face of second elongate web are brought into contact. The micro-encapsulated component of the first and second adhesive is released, and the first and second components of the two-component adhesive are mixed ultrasonically. This release and mixing preferably occurs after the first and second elongate webs are brought together, but can alternatively occur before the first and second webs are brought together.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of adhering first and second elongate webs, the method comprising:
  depositing only a first component of a two-component solvent-free adhesive system on a first face of the first elongate web;
  depositing only a second component of the two-component solvent-free adhesive system on a first face of the second elongate web;
  pressing the first face of the first elongate web and the first face of the second elongate web into contact to mix the first and second components and activate a curing reaction of the first and second components of the two-component solvent-free adhesive system between the first face of the first elongate web and the first face of the second elongate web.

2. The method according to claim 1, further comprising, after the step of pressing the first face of the first elongate web and the first face of the second elongate web into contact to mix the two components and activate a curing reaction of the two components of the solvent-free adhesive system, sonificating the two components of the solvent-free adhesive system to enhance mixing of the two components.

3. The method according to claim 1, further comprising, after the step of pressing the first face of the first elongate web and the first face of the second elongate web into contact to mix the two components and activate a curing reaction of the two components of the solvent-free adhesive system, heating the two components of the solvent-free adhesive system to enhance mixing of the two components.

4. The method according to claim 1, wherein one of the two components is microencapsulated.

* * * * *